United States Patent
Yamazaki

(10) Patent No.: US 10,530,521 B2
(45) Date of Patent: Jan. 7, 2020

(54) DETERMINING FIRST MODULATION AND CODING SCHEME APPLIED TO SIGNAL BASED ON PREDICTED COMMUNICATION QUALITY OF SIGNAL WHEN TRANSMITTED AND RETRANSMITTED

(71) Applicant: NEC Corporation, Minato-ku, Tokyo (JP)

(72) Inventor: Kenichirou Yamazaki, Tokyo (JP)

(73) Assignee: NEC CORPORATION, Tokyo (JP)

( * ) Notice: Subject to any disclaimer, the term of this patent is extended or adjusted under 35 U.S.C. 154(b) by 0 days.

(21) Appl. No.: 15/763,175

(22) PCT Filed: Sep. 20, 2016

(86) PCT No.: PCT/JP2016/004264
§ 371 (c)(1),
(2) Date: Mar. 26, 2018

(87) PCT Pub. No.: WO2017/056446
PCT Pub. Date: Apr. 6, 2017

(65) Prior Publication Data
US 2018/0287730 A1   Oct. 4, 2018

(30) Foreign Application Priority Data
Sep. 30, 2015 (JP) .................... 2015-193436

(51) Int. Cl.
*H04L 1/00* (2006.01)
*H04W 28/18* (2009.01)
(Continued)

(52) U.S. Cl.
CPC .............. *H04L 1/0003* (2013.01); *H04L 1/18* (2013.01); *H04W 28/18* (2013.01); *H04L 27/3416* (2013.01); *H04W 72/0466* (2013.01)

(58) Field of Classification Search
CPC . H04L 1/00; H04L 1/0003; H04L 1/16; H04L 1/18; H04L 27/00; H04L 27/3416;
(Continued)

(56) References Cited

U.S. PATENT DOCUMENTS

2003/0039227 A1* 2/2003 Kwak .................. H04L 1/0009
370/330
2005/0013303 A1* 1/2005 Gopalakrishnan .... H04L 1/0003
370/395.21
(Continued)

FOREIGN PATENT DOCUMENTS

JP   2007-74122 A   3/2007
JP   2011-515061 A   5/2011
(Continued)

OTHER PUBLICATIONS

Japanese Office Action for JP Application No. 2017-542724 dated Oct. 2, 2018 with English Translation.
(Continued)

*Primary Examiner* — Kan Yuen

(57) ABSTRACT

[Problem] According to conventional techniques, a modulation class is determined on the basis of past communication environment information stored at a base station, and the modulation class cannot be determined with consideration of a communication environment in which a signal is retransmitted. Thus, with the conventional techniques, a modulation and coding scheme cannot be determined with consideration of the communication environment in which the signal is retransmitted.

[Solution] An embodiment of this communication system has a control unit that determines a first modulation and coding scheme to be applied to a signal on the basis of information about predicted first communication quality when a signal is transmitted at a first timing and information
(Continued)

about predicted second communication quality when the signal is retransmitted at a second timing.

7 Claims, 15 Drawing Sheets

(51) Int. Cl.
*H04L 1/18* (2006.01)
*H04L 27/34* (2006.01)
*H04W 72/04* (2009.01)

(58) Field of Classification Search
CPC ..... H04W 16/32; H04W 28/04; H04W 28/18; H04W 72/04; H04W 72/0466
See application file for complete search history.

(56) References Cited

U.S. PATENT DOCUMENTS

| | | | |
|---|---|---|---|
| 2009/0175369 A1* | 7/2009 | Atarashi | H04L 1/0003 375/260 |
| 2009/0235140 A1 | 9/2009 | Yue et al. | |
| 2014/0269457 A1 | 9/2014 | Folke et al. | |

FOREIGN PATENT DOCUMENTS

| | | |
|---|---|---|
| JP | 2013-62776 A | 4/2013 |
| JP | 2014-216872 A | 11/2014 |
| WO | 2013/146273 A1 | 10/2013 |
| WO | 2015/019174 A2 | 2/2015 |

OTHER PUBLICATIONS

Ogata et al., "A Study on Adaptive Modulation and Coding Control for ABS Pattern Change in eICIC", Proceedings to the 2015 IEICE Communications Society Conference Aug. 1, 2015, p. 309, B-5-47.
International Search Report dated Dec. 13, 2016 in counterpart international application No. PCT/JP2016/004264.
Communication from the European Patent Office dated Apr. 17, 2019, an Extended European Search Report in counterpart Application No. 16850626.9.
Kwang-Chun Go et al., "Application-Aware MCS Level Selection Method for Cross-Layered Retransmission Scheme", IEEE Communications Letters, vol. 18, No. 2, Feb. 2014, pp. 209-212 (4 pages total).
Sophia Antipolis, "AMC and HARQ for HSDPA", 3GPP TSG RAN WG1 & WG2 meeting on HSDPA, Lucent Technologies, 12A010030, Apr. 5-6, 2001, 21 pages total.

* cited by examiner

| MCS Index | MODULATION SCHEME | CODING RATE |
|---|---|---|
| 0 | BPSK | 1/2 |
| 1 | QPSK | 1/2 |
| 2 | QPSK | 3/4 |
| 3 | 16QAM | 1/2 |
| 4 | 16QAM | 3/4 |
| 5 | 64QAM | 2/3 |
| 6 | 64QAM | 3/4 |
| 7 | 64QAM | 5/6 |
| 8 | 256QAM | 3/4 |

DETERMINING FIRST MODULATION AND CODING SCHEME APPLIED TO SIGNAL BASED ON PREDICTED COMMUNICATION QUALITY OF SIGNAL WHEN TRANSMITTED AND RETRANSMITTED

This application is a National Stage Entry of PCT/JP2016/004264 filed on Sep. 20, 2016, which claims priority from Japanese Patent Application 2015-193436 filed on Sep. 30, 2015, the contents of all of which are incorporated herein by reference, in their entirety.

TECHNICAL FIELD

The present invention relates to a communication device, a communication system, a control method, and a communication program in a wireless communication network.

BACKGROUND ART

A device, which performs wireless communication such as a terminal device and a base station device, performs the communication by using a modulation coding scheme (for example, a modulation and coding scheme (MCS)) depending on a communication environment.

For example, Patent Literature 1 discloses a method in which a base station device stores communication environment information on a communication environment transmitted from a terminal device and a modulation class (current modulation class (CMC)) is determined using a plurality of types of most recent communication environment information depending on an occurrence state of an error.

CITATION LIST

Patent Literature

[PTL 1] JP 2014-216872 A
[PTL 2] WO 2013/146273

SUMMARY OF INVENTION

Technical Problem

Here, there is a case where a base station device is not able to correctly receive a signal transmitted from a terminal device due to deterioration of communication quality between the terminal device and the base station device. In this case, there is a case where the terminal device retransmits the signal. There is a case where the terminal device uses the same modulation and coding scheme as the modulation and coding scheme used when initially transmitting a signal to the base station device, when the terminal device retransmits the signal. In a case where communication quality between the terminal device and the base station device when the terminal device retransmits the signal is lower than communication quality when the terminal device initially transmits the signal to the base station device, it is probable that the base station device is not able to correctly receive the retransmitted signal. Therefore, retransmission is repeatedly performed, resulting in wastefulness of a radio resource and an increase in a load of the device that transmits the signal.

However, in the method disclosed in PTL 1, since the modulation class is determined based on the past communication environment information stored in the base station device, it is not possible to determine the modulation class in consideration of a communication environment when retransmitting a signal. Therefore, the method disclosed in PTL 1 does not solve the aforementioned problem.

Thus, one of the objects to be achieved in the example embodiments disclosed in the present specification is to determine a modulation and coding scheme in consideration of communication quality when retransmitting a signal.

Solution to Problem

The base station device according to the present example embodiment includes a control means that determines a first modulation and coding scheme to be applied to a signal, based on information on predicted first communication quality when the signal is transmitted at a first timing and information on predicted second communication quality when the signal is retransmitted at a second timing.

The terminal device according to the present example embodiment includes: a reception means that receives, from a base station device, information on a first modulation and coding scheme determined based on first information on predicted first communication quality when a signal is transmitted at a first timing and second information on predicted second communication quality when the signal is retransmitted at a second timing; and; a transmission means that transmits the signal to the base station device, based on the information on the first modulation and coding scheme.

Advantageous Effects of Invention

According to the aforementioned example embodiments, it is possible to determine a modulation and coding scheme in consideration of communication quality when retransmitting a signal.

DESCRIPTION OF EMBODIMENTS

Figure 1:
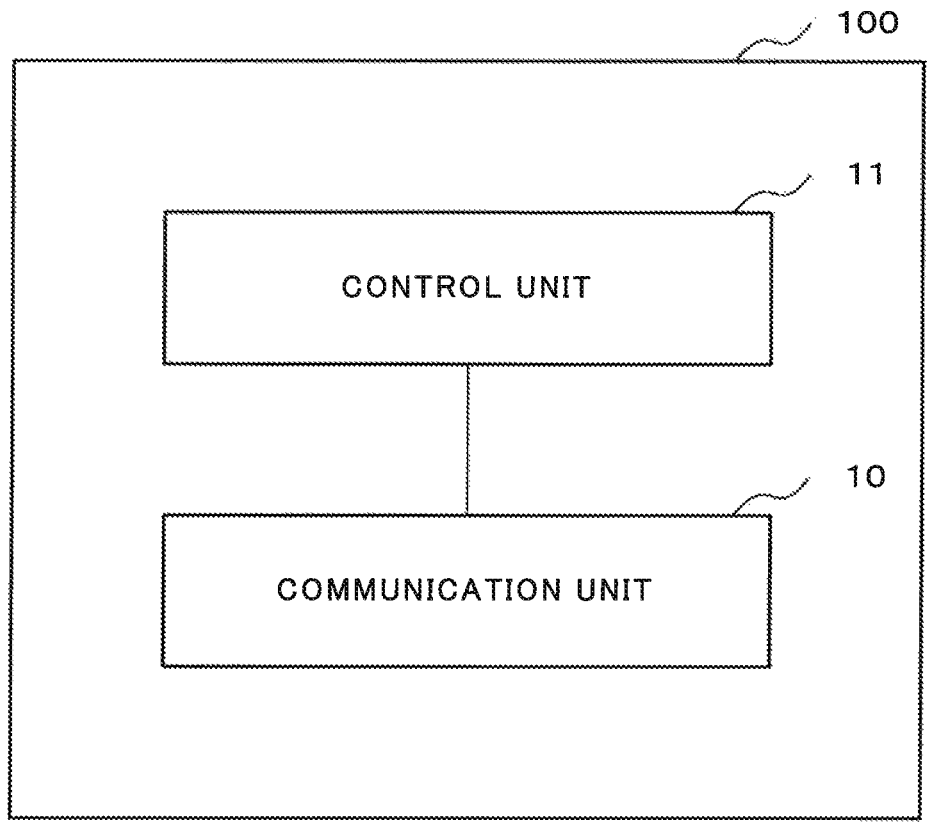
FIG. 1 is a block diagram of a base station device according to a first example embodiment.

Hereinafter, specified example embodiments will be described in detail with reference to the drawings. In each drawing, the same reference numerals are given to the same or corresponding elements and redundant description is omitted when necessary in order to clarify description.

A plurality of example embodiments to be described below can be independently implemented or can be implemented through appropriate combinations thereof. The plurality of example embodiments has new characteristics different from one another. Consequently, the plurality of example embodiments contributes to solving objects or problems different from one another, and contribute to obtaining effects different from one another.

First Example Embodiment

FIG. 1 illustrates an example of a configuration of a base station device 100 according to a first example embodiment.

The base station device 100 has at least a communication unit 10 and a control unit 11.

The communication unit 10 communicates with various communication devices.

The control unit 11 determines a modulation and coding scheme to be applied to a signal, based on information on predicted first communication quality when the signal is transmitted at a first timing and information on predicted second communication quality when the signal is retransmitted at a second timing.

Note that the modulation and coding scheme determined by the control unit 11 is applied to both the signal transmitted at the first timing and the signal retransmitted at the second timing.

It is sufficient if the information on the first communication quality and the information on the second communication quality are information indicating communication quality between a base station device and a terminal device. For example, the information includes a signal to interference noise ratio (SINR).

Further, it is sufficient if the modulation and coding scheme indicates the number of bits transmittable per one symbol, such as a MCS. Furthermore, the modulation and coding scheme may be information indicated by a MCS index. The MCS index uniquely indicates a modulation scheme or a data rate. The modulation scheme, for example, includes frequency shift keying (FSK), minimum shift keying (MSK), Gaussian-filtered minimum shift keying (GMSK), binary phase shift keying (BPSK), quadrature phase shift keying (QPSK), 8 phase shift keying (8 PSK), 16 quadrature amplitude modulation (16 QAM), 64 QAM, 256 QAM and the like.

Figure 2:
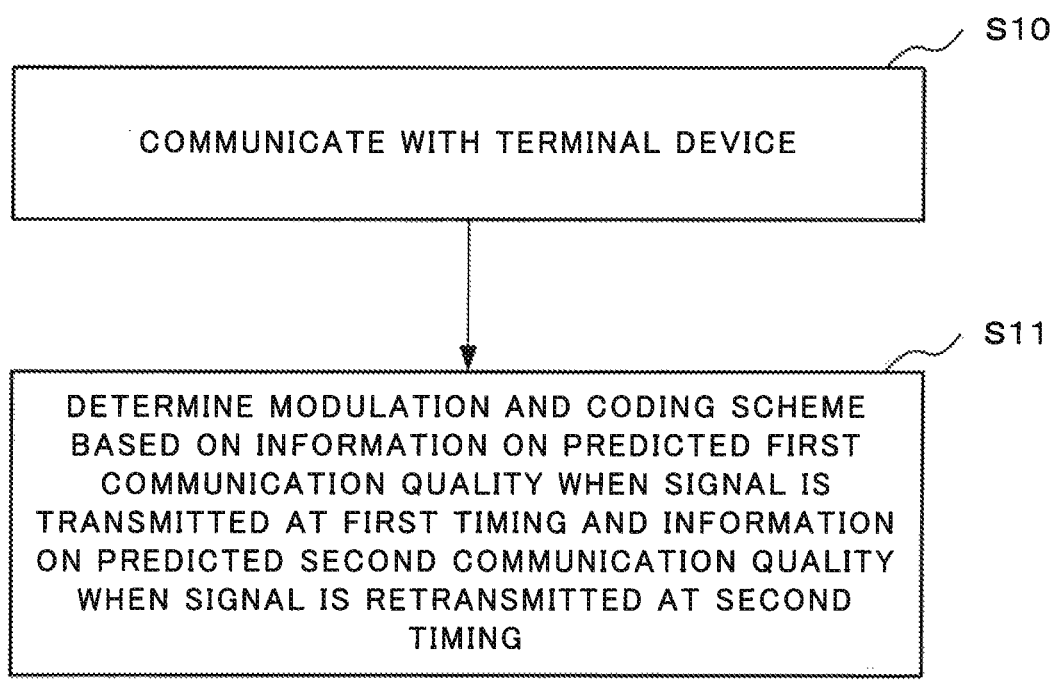
FIG. 2 is a flowchart of an operation of the base station device according to the first example embodiment.

Next, the operation of the base station device 100 of the present example embodiment will be described using FIG. 2.

The communication unit 10 communicates with a terminal device (step S10).

The control unit 11 determines the modulation and coding scheme to be applied to the signal, based on the information on the predicted first communication quality when the signal is transmitted at the first timing and the information on the predicted second communication quality when the signal is retransmitted at the second timing (step S11).

By so doing, the base station device 100 in the present example embodiment determines the modulation and coding scheme to be applied to the signal, based on the information on the predicted first communication quality when the signal is transmitted at the first timing and the information on the predicted second communication quality when the signal is retransmitted at the second timing. In this way, it is possible to determine a modulation and coding scheme in consideration of communication quality when retransmitting a signal.

Second Example Embodiment

Next, a communication system in a second example embodiment of the present invention will be described.

In the first example embodiment, the base station device determines the modulation and coding scheme to be applied to the signal in consideration of the information on the predicted first communication quality when the signal is transmitted at the first timing and the information on the predicted second communication quality when the signal is retransmitted at the second timing. On the other hand, in the present example embodiment, the modulation and coding scheme to be applied to the signal is determined based on information on lower quality one of the first communication quality and the second communication quality.

Figure 3:
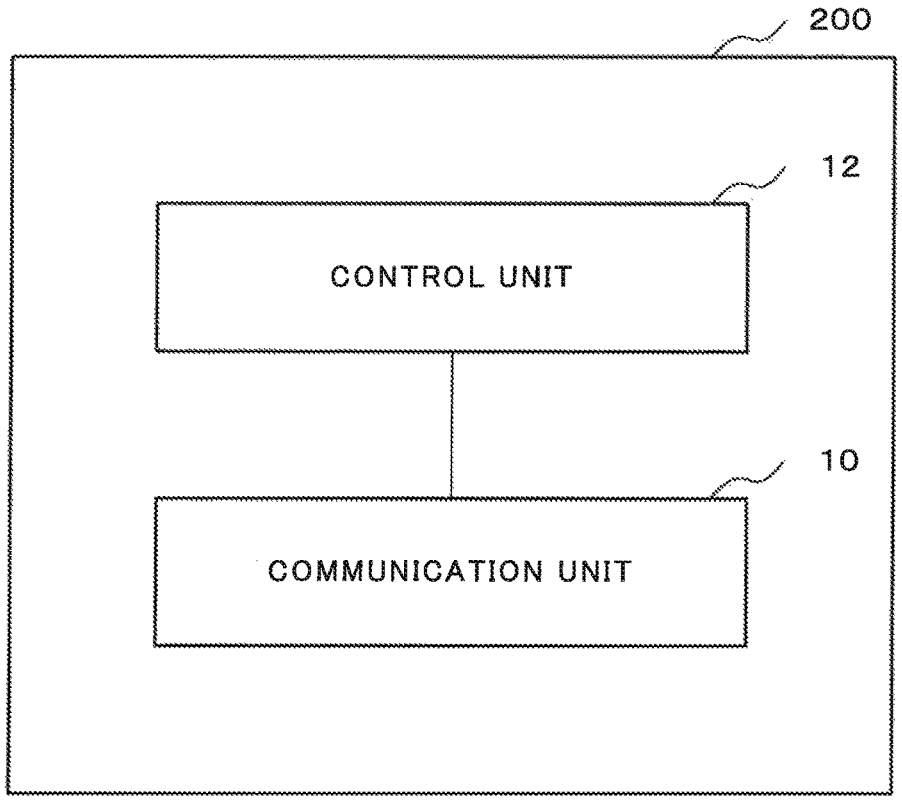
FIG. 3 is a block diagram of a base station device according to a second example embodiment.

FIG. 3 illustrates an example of a configuration of a base station device 200 in the present example embodiment.

The base station device 200 has at least a communication unit 10 and a control unit 12.

The communication unit 10 is similar to the communication unit of the first example embodiment.

The control unit 12 selects information on lower quality one of the information on the predicted first communication quality when the signal is transmitted at the first timing and the information on the predicted second communication quality when the signal is retransmitted at the second timing. Moreover, based on the selected information on the first communication quality or information on the second communication quality, the control unit 12 determines the modulation and coding scheme to be applied to the signal.

For example, when the second communication quality is lower than the first communication quality, the control unit 12 determines the modulation and coding scheme, based on the information on the second communication quality. Furthermore, when the first communication quality is lower than the second communication quality, the control unit 12 determines the modulation and coding scheme, based on the information on the first communication quality.

Hereinafter, the modulation and coding scheme determined based on the information on the first communication quality is assumed as a first modulation and coding scheme, and the modulation and coding scheme determined based on the information on the second communication quality is assumed as a second modulation and coding scheme. When the second communication quality is lower than the first communication quality, it is sufficient if the second modulation and coding scheme is a modulation and coding scheme in which the number of bits transmittable per one symbol is smaller than that of the first modulation and coding scheme. For example, when the second communication quality is lower than the first communication quality and a modulation scheme indicated by the first modulation and coding scheme is the 256 QAM, a modulation scheme indicated by the second modulation and coding scheme is any one of the FSK, the MSK, the GMSK, the BPSK, the QPSK, the 8 PSK, the 16 QAM, and the 64 QAM for example.

Figure 4:
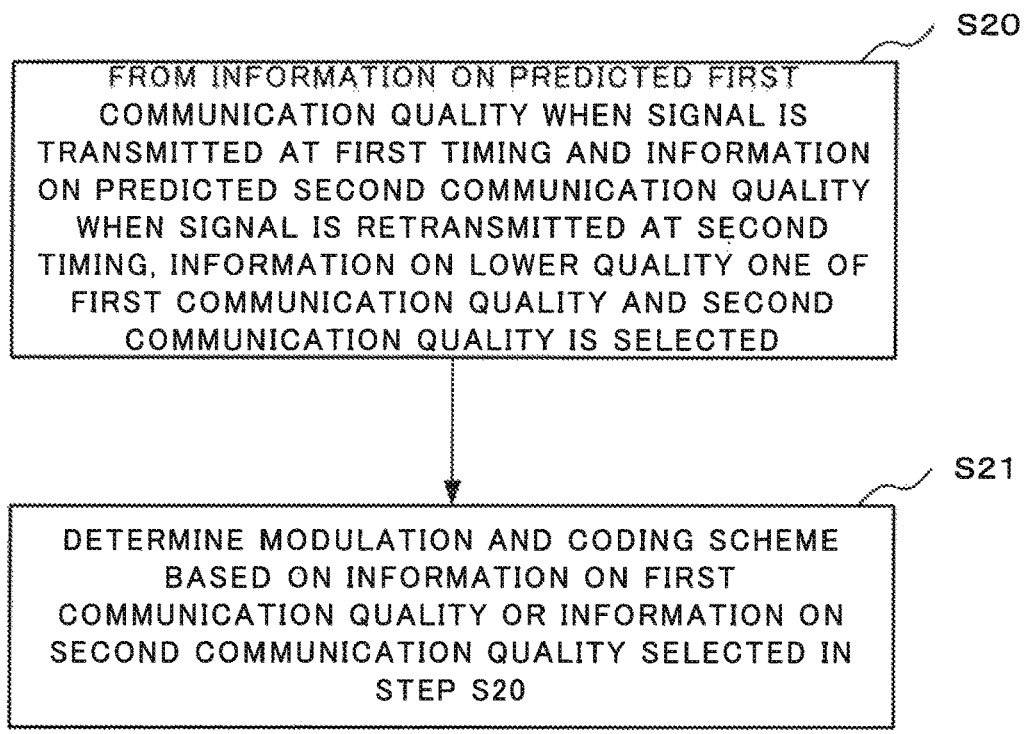
FIG. 4 is a flowchart of an operation of the base station device according to the second example embodiment.

Next, the operation of the base station device 200 of the present example embodiment will be described using FIG. 4.

Firstly, from the information on the predicted first communication quality when the signal is transmitted at the first timing and the information on the predicted second communication quality when the signal is retransmitted at the second timing, the control unit 12 selects information on lower quality one from the first communication quality and the second communication quality (step S20).

Based on the information on the first communication quality or the information on the second communication quality selected in step S20, the control unit 12 determines the modulation and coding scheme (step S21).

The base station device 200 in the present example embodiment determines the modulation and coding scheme, based on information on lower quality one of the predicted communication quality when the signal is transmitted at the first timing and the predicted communication quality when the signal is retransmitted at the second timing. Therefore, in consideration of the predicted communication quality when the signal is retransmitted at the second timing as well as the predicted communication quality when the signal is transmitted at the first timing, it is possible to determine the modulation and coding scheme to be applied to the signal. Moreover, in the base station device 200 of the present example embodiment, a modulation and coding scheme suitable for lower quality communication quality is determined. In this way, it is possible to more reliably transmit and receive a signal between a base station device and a terminal device, thereby reducing the number of times by which a signal is retransmitted.

Third Example Embodiment

Next, a communication system in a third example embodiment of the present invention will be described.

In the present example embodiment, a base station device assumes that the information on the predicted first communication quality when the signal is transmitted at the first timing is a first value and the information on the predicted second communication quality when the signal is retransmitted at the second timing is a second value. Then, the base station device determines the modulation and coding scheme to be applied to the signal, based on information obtained by weighting and averaging the first value and the second value.

The following description will be given on the assumption that the first value is a first SINR and the second value is a second SINR.

Figure 5:
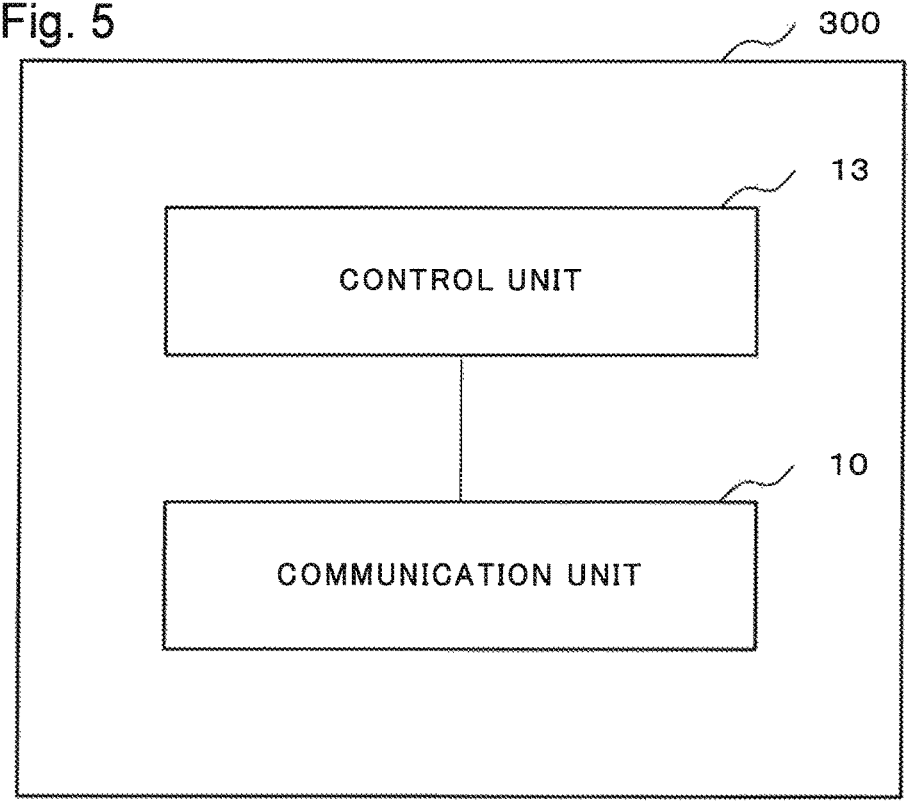
FIG. 5 is a block diagram of a base station device according to a third example embodiment.

FIG. 5 illustrates an example of a configuration of a base station device 300 in the present example embodiment.

The base station device 300 includes at least a communication unit 10 and a control unit 13.

The communication unit 10 is similar to the communication unit of the first example embodiment.

The control unit 13 determines the modulation and coding scheme to be applied to the signal, based on a value obtained by multiplying the first SINR by α and a value obtained by multiplying the second SINR by β.

Note that the α and the β may be real numbers or imaginary numbers. For example, when the α is 0.5 and the β is 0.5, the control unit 13 determines the modulation and coding scheme, based on an average value of the first SINR and the second SINR. For example, when the α has a value larger than that of the β, the control unit 13 determines the modulation and coding scheme by paying more attention to the first SINR than the second SINR.

When the modulation and coding scheme is determined, whether to pay more attention to the first SINR or the second SINR may be determined or changed depending on the type of a terminal device, or may be determined or changed depending on communication quality between a base station device and a terminal device or a distance between the base station device and the terminal device. Alternatively, the values of the α and the β may be determined or changed based on whether a terminal device is a movable terminal device or a stationary terminal device. Furthermore, the values of the α and the β may be determined or changed based on whether a terminal device is a machine type communications (MTC) machine terminal or a terminal device operated by a user.

Figure 6:
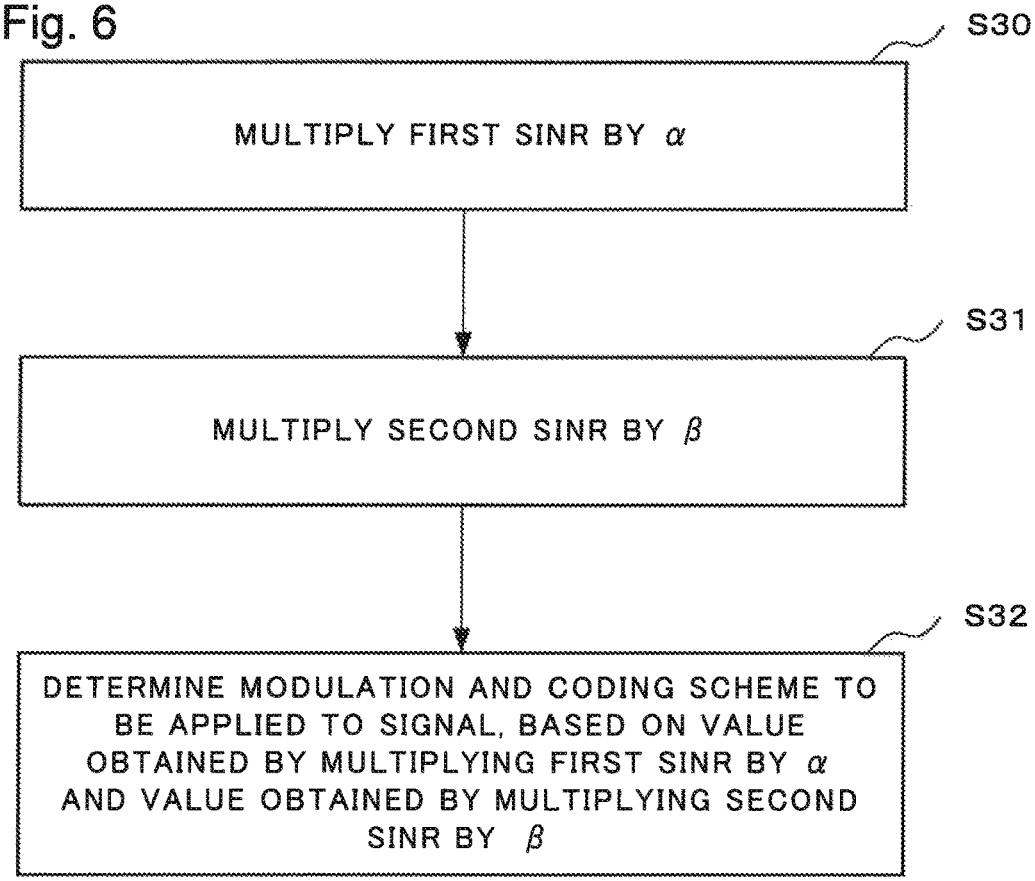
FIG. 6 is a flowchart of an operation of the base station device according to the third example embodiment.

Next, the operation of the base station device 300 of the present example embodiment will be described using FIG. 6.

Firstly, the control unit 13 multiplies the first SINR by the α (step S30).

The control unit 13 multiplies the second SINR by the β (step S31).

The control unit 13 determines the modulation and coding scheme to be applied to the signal, based on the value obtained by multiplying the first SINR by the α and the value obtained by multiplying the second SINR by the β (step S32).

The base station device 300 in the present example embodiment can determine the modulation and coding scheme to be applied to the signal in consideration of the second SINR as well as the first SINR. Moreover, the base station device 300 in the present example embodiment can also flexibly change whether to pay more attention to the first SINR or the second SINR.

Fourth Example Embodiment

Next, a fourth example embodiment of the present invention will be described. A communication system in the present example embodiment is obtained by further specifying the communication system in the first example embodiment.

In the present example embodiment, it is assumed that the information on the predicted first communication quality when the signal is transmitted at the first timing is the first value and the information on the predicted second communication quality when the signal is retransmitted at the second timing is the second value.

The following description will be given on the assumption that the first value is the first SINR and the second value is the second SINR.

Figures 7, 8:
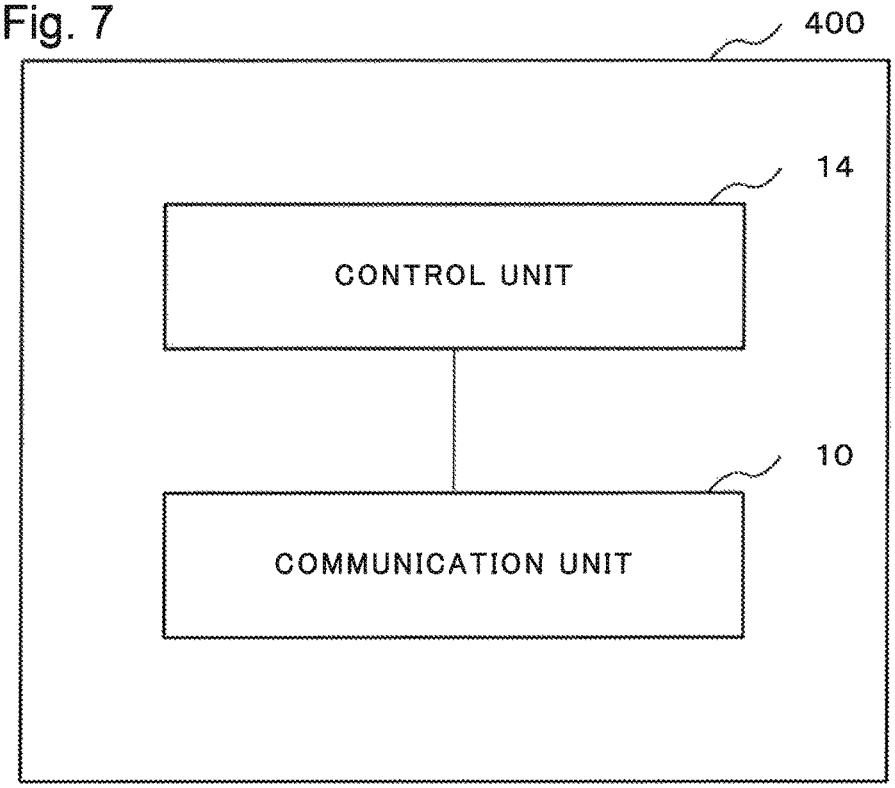
FIG. 7 is a block diagram of a base station device according to a fourth example embodiment.
FIG. 8 is a table illustrating a relation of a MCS index and a modulation scheme.

FIG. 7 illustrates an example of a configuration of a base station device 400 in the present example embodiment.

The base station device 400 includes at least a communication unit 10 and a control unit 14.

The communication unit 10 is similar to the communication unit of the first example embodiment.

The control unit 14 determines an offset value, based on a difference between the first SINR and the second SINR. The control unit 14 determines the modulation and coding scheme to be applied to the signal, based on the determined offset value and a modulation and coding scheme to be determined based on the first SINR.

Hereinafter, a further detailed example will be described by assuming that the modulation and coding scheme determined by the control unit 14 is information indicated by a MCS index. The MCS index and a modulation scheme, for example, have a relation as illustrated in a table of FIG. 8. It is assumed that a MCS index determined based on the first SINR is 7.

When the first SINR and the second SINR are different from each other, the control unit 14 determines an offset value of the MCS index. For example, an offset value when the first SINR is larger than the second SINR is assumed to −N (N is a natural number). In this case, the control unit 14 assumes the MCS index as a value obtained by subtracting N from 7. On the other hand, an offset value when the first SINR is smaller than the second SINR is assumed to +M (M is a natural number). In this case, the control unit 14 assumes the MCS index as a value obtained by adding M to 7.

Note that when the first SINR and the second SINR are equal to each other, the control unit 14 may determine the MCS index by assuming the offset value to 0.

The size of the offset value may be determined based on the difference between the first SINR and the second SINR. For example, the larger difference between the first SINR and the second SINR is, the larger offset value may be set. Furthermore, when the difference between the first SINR and the second SINR is small, the offset value may also be set to a small value (or 0).

Figure 9:
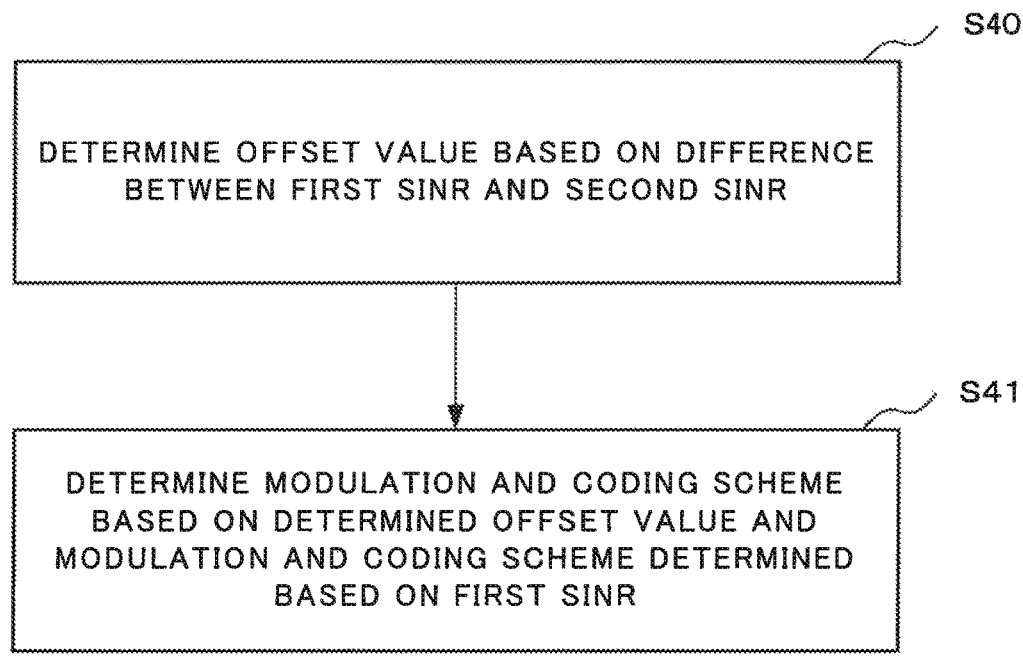
FIG. 9 is a flowchart of an operation of the base station device according to the fourth example embodiment.

Next, the operation of the base station device 400 of the present example embodiment will be described using FIG. 9.

The control unit 14 determines the offset value, based on the difference between the first SINR and the second SINR (step S40).

The control unit 14 determines the modulation and coding scheme, based on the determined offset value and the modulation and coding scheme to be determined based on the first SINR (step S41).

The base station device 400 in the present example embodiment obtains effects similar to those of the base station device described in the first example embodiment.

Next, a modification example of the aforementioned fourth example embodiment will be described.

The base station device in the aforementioned fourth example embodiment adds (subtracts) the offset value of the MCS index to (from) the MCS index determined based on the first SINR. On the other hand, a base station device in the modification example of the fourth example embodiment, which will be described below, adds (subtracts), to (from) the first SINR, an offset value of an SINR determined based on the difference between the first SINR and the second SINR.

Figure 10:
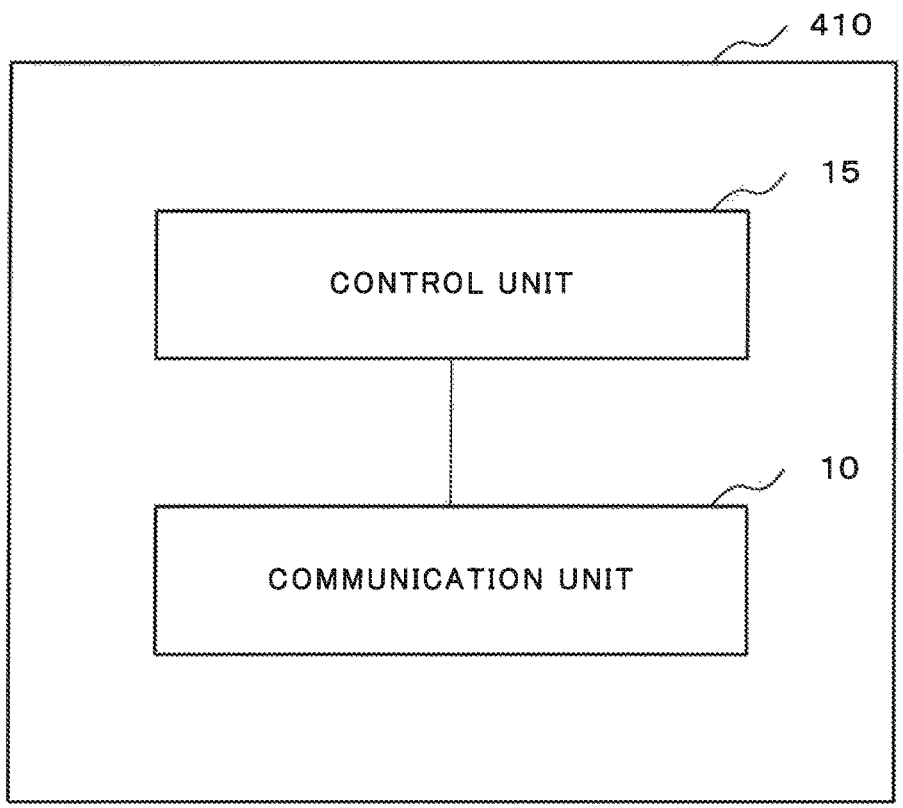
FIG. 10 is a block diagram of a base station device according to a modification example of the fourth example embodiment.

FIG. 10 illustrates an example of a configuration of a base station device 410 in the modification example of the fourth example embodiment.

The base station device 410 includes at least a communication unit 10 and a control unit 15.

The communication unit 10 is similar to the communication unit of the first example embodiment.

The control unit 15 determines an offset value of an SINR, based on the difference between the first SINR and the second SINR. The control unit 15 determines the modulation and coding scheme, based on the first SINR and the determined offset value.

In the following specified example, it is assumed that the modulation and coding scheme determined by the control unit 15 is information indicated by the MCS index.

When the first SINR and the second SINR are different from each other, the control unit 15 determines the offset value of the SINR. For example, an offset value when the first SINR is larger than the second SINR is assumed to −P (P is a natural number). In this case, the control unit 15 assumes a value obtained by subtracting P from the first SINR as a third SINR, and determines the MCS index based on the third SINR. On the other hand, an offset value when the first SINR is smaller than the second SINR is assumed to +Q (Q is a natural number). In this case, the control unit 15 assumes a value obtained by adding Q to the first SINR as the third SINR, and determines the MCS index based on the third SINR.

Note that when the first SINR and the second SINR are equal to each other, the control unit 15 may determine the MCS index by assuming the offset value to 0.

The size of the offset value may be determined based on the difference between the first SINR and the second SINR. For example, the larger difference between the first SINR and the second SINR is, the larger offset value may be set.

Figure 11:
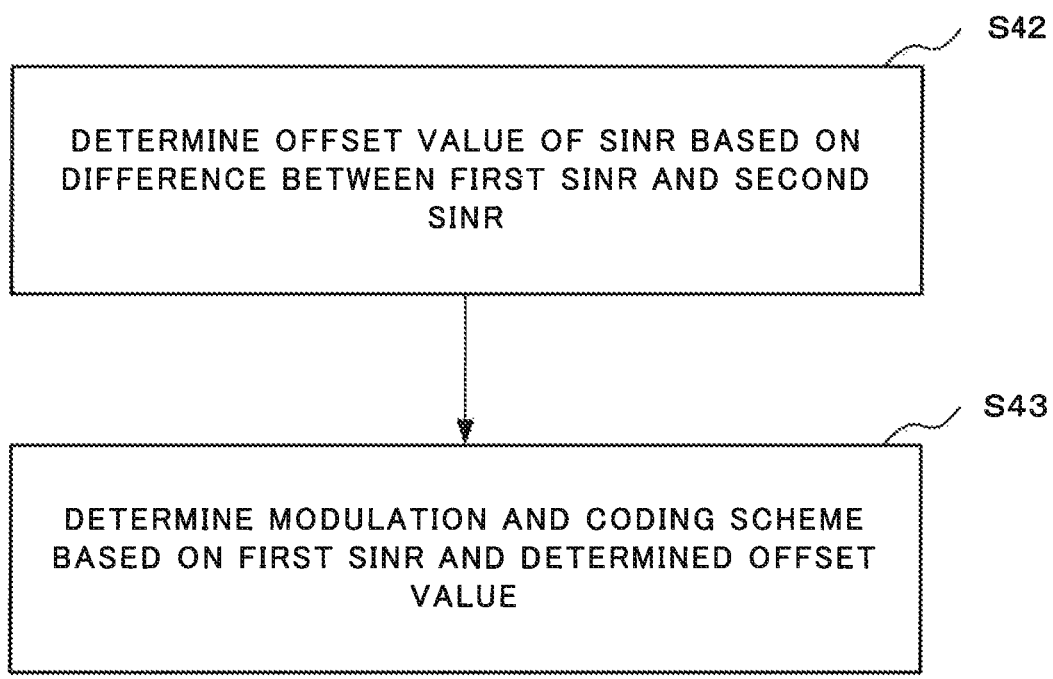
FIG. 11 is a flowchart of an operation of the base station device according to a modification example of the fourth example embodiment.

Next, the operation of the base station device 410 of the present example embodiment will be described using FIG. 11.

The control unit 15 determines the offset value of the SINR, based on the difference between the first SINR and the second SINR (step S42).

The control unit 15 determines the modulation and coding scheme, based on the first SINR and the determined offset value (step S43).

The base station device 410 in the present example embodiment obtains effects similar to those of the base station device described in the first example embodiment.

Fifth Example Embodiment

In the fifth example embodiment of the present invention, a description will be provided for a case where the present invention is applied to an LTE communication system.

Figure 12:
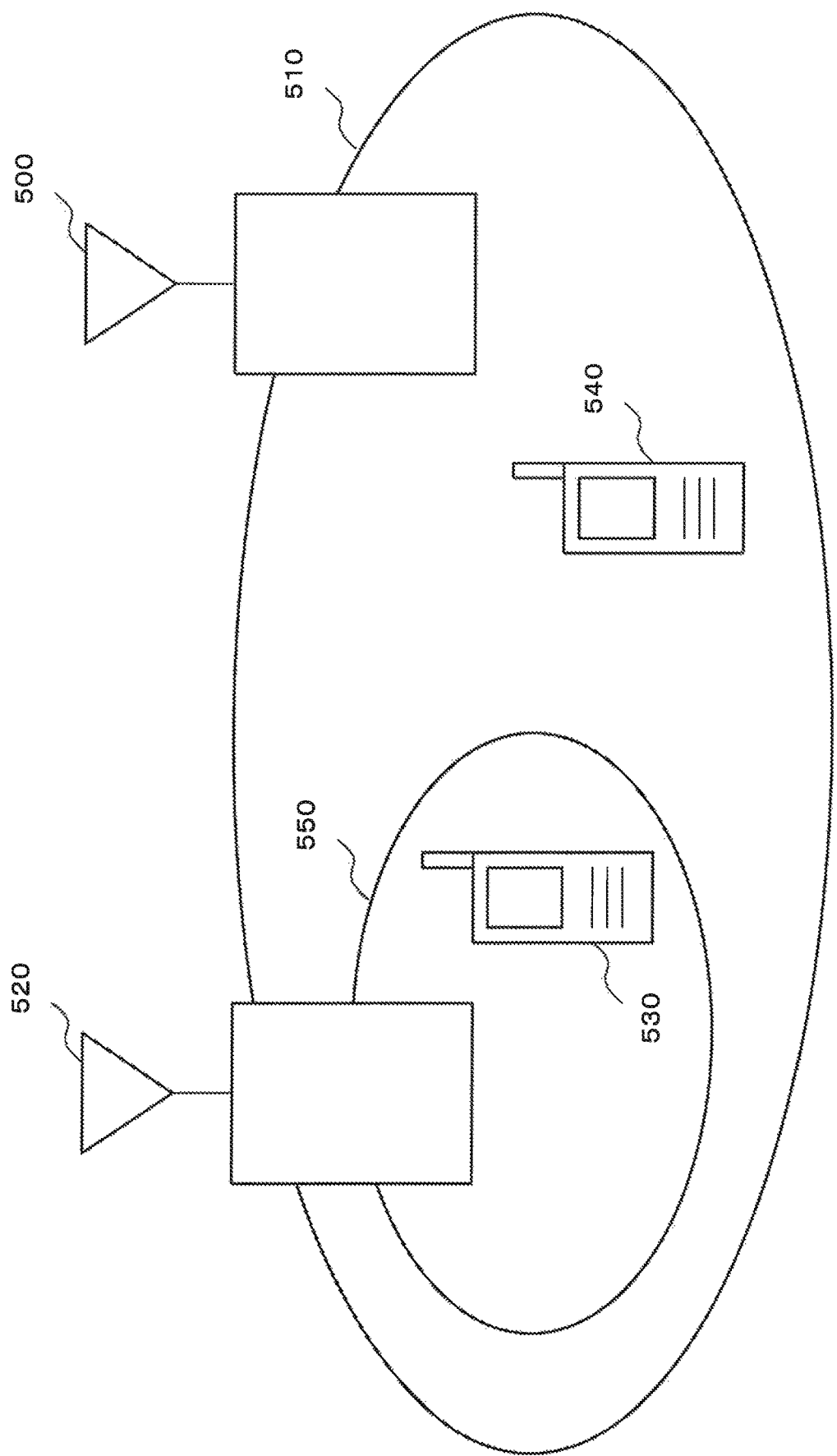
FIG. 12 is a configuration diagram of a communication system according to a fifth example embodiment.

FIG. 12 illustrates a configuration example of the communication system according to the present example embodiment. The communication system provides a communication service, for example, a voice communication, a packet data communication, or a combination thereof. Referring to FIG. 12, the communication system includes a base station device 500, a macro cell 510 serving as a communication area of the base station device 500, a base station device 520, a small cell 530 serving as a communication area of the base station device 520, a terminal device 540 communicating with the base station device 500, and a terminal device 550 communicating with the base station device 520.

In a long term evolution (LTE) scheme, enhanced inter-cell interference coordination (eICIC) is employed in order to reduce inter-cell interference. In the eICIC, almost blanc subframe (ABS) is defined in order to reduce the inter-cell interference. In principle, a terminal device performs data communication by using subframes other than the ABS subframe and performs no data communication by using the ABS subframe.

Figure 13:
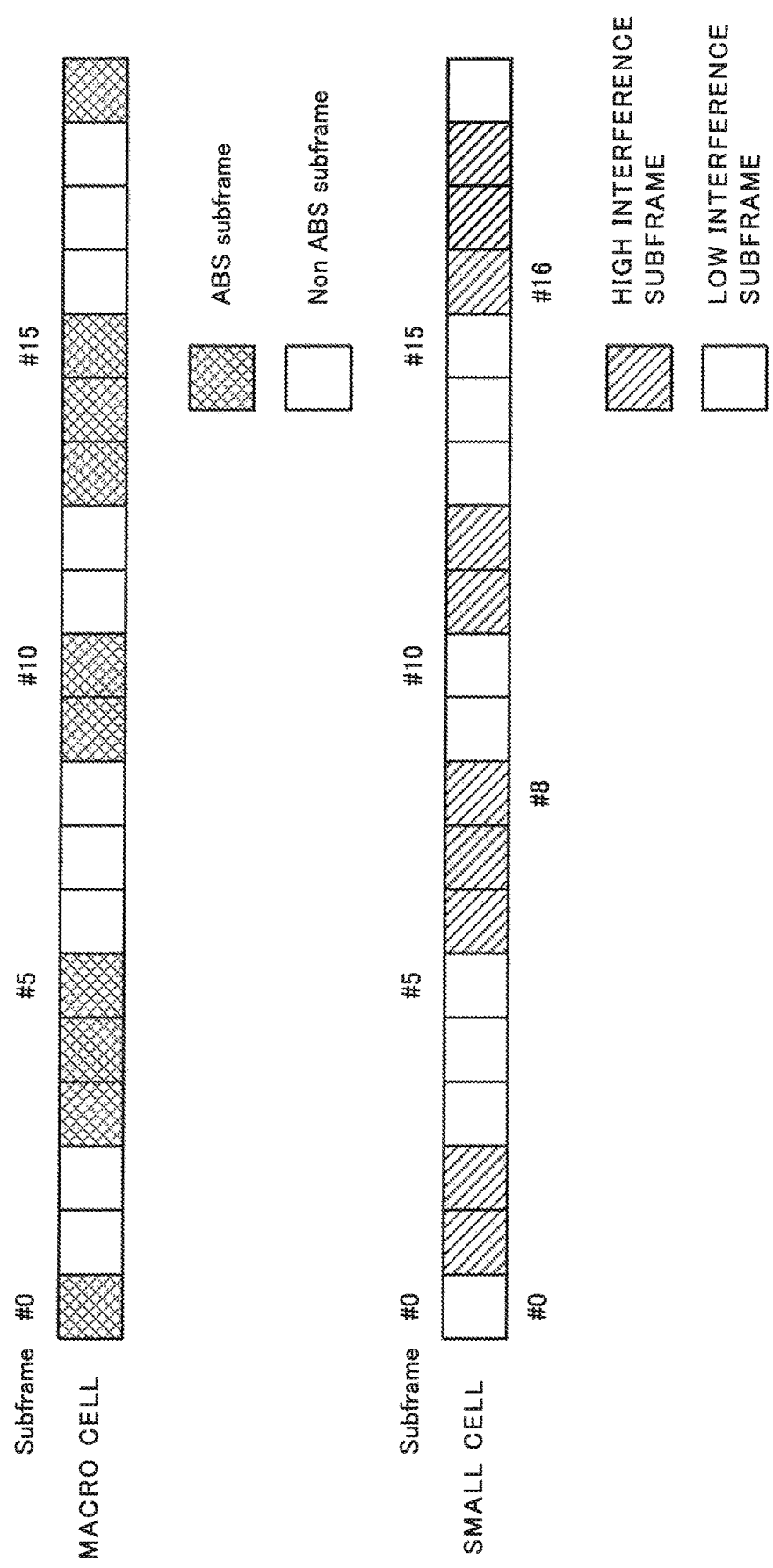
FIG. 13 is an example of an ABS pattern.

FIG. 13 illustrates an example of an ABS pattern. Subframes #0, #3 to #5, #9 to #10, #13 to #15, and #20 are set as ABS subframes, and the other subframes are set as non-ABS subframes. Between the macro cell 510 and the small cell 530, frame timing synchronization is assumed to be made. In the macro cell 510, the ABS pattern as illustrated in FIG. 13 is set.

Hereinafter, uplink (UL) transmission, in which a terminal device transmits a signal to a base station device, will be described; however, the following operation may also be applied to downlink (DL) transmission from the base station device to the terminal device.

In the macro cell 510, the terminal device 540 performs UL transmission to the base station device 500 by using the non-ABS subframe. In the case of the non-ABS subframe used in the macro cell 510, communication between the base station device 520 and the terminal device 550 receives interference from the macro cell 510. On the other hand, in the case of the ABS subframe used in the macro cell 510, the communication between the base station device 520 and the terminal device 550 receives no interference from the macro cell 510.

The base station device 500 and the base station device 520 have a function of performing non-adaptive retransmission when a reception error occurs. The non-adaptive retransmission is defined as an operation of allocating a retransmission signal to the same resource allocated to a terminal device by a base station device. For example, it is assumed that in the small cell 530, the terminal device 550 performs UL transmission at the subframe #0 and a reception error occurs at the base station device 520 that receives the UL transmission. When the non-adaptive retransmission is performed, the subframe #0 of initial transmission is a low interference subframe, but the subframe #8 (it is assumed that retransmission is next to 8 subframes of the initial transmission), which is a retransmission timing, is a high interference subframe.

Figure 14:
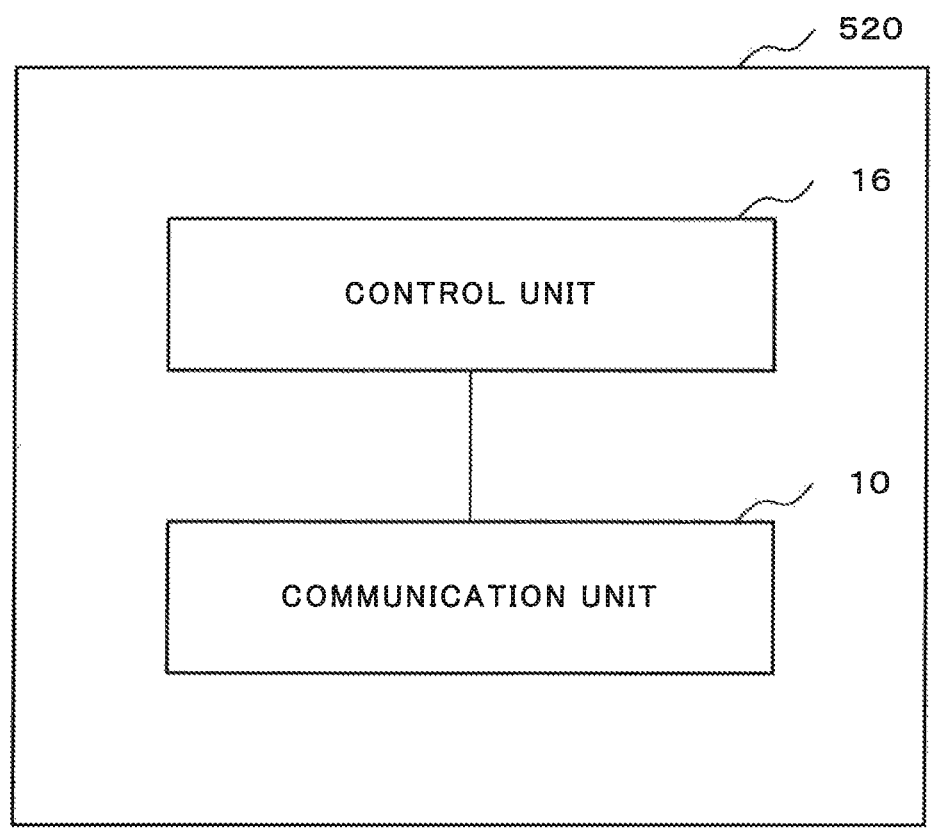
FIG. 14 is a block diagram of a base station device according to the fifth example embodiment.

FIG. 14 illustrates an example of a configuration of the base station device 520 of the present example embodiment.

The base station device 520 includes at least a communication unit 10 and a control unit 16.

The communication unit 10 is similar to the communication unit of the first example embodiment.

Figure 15:
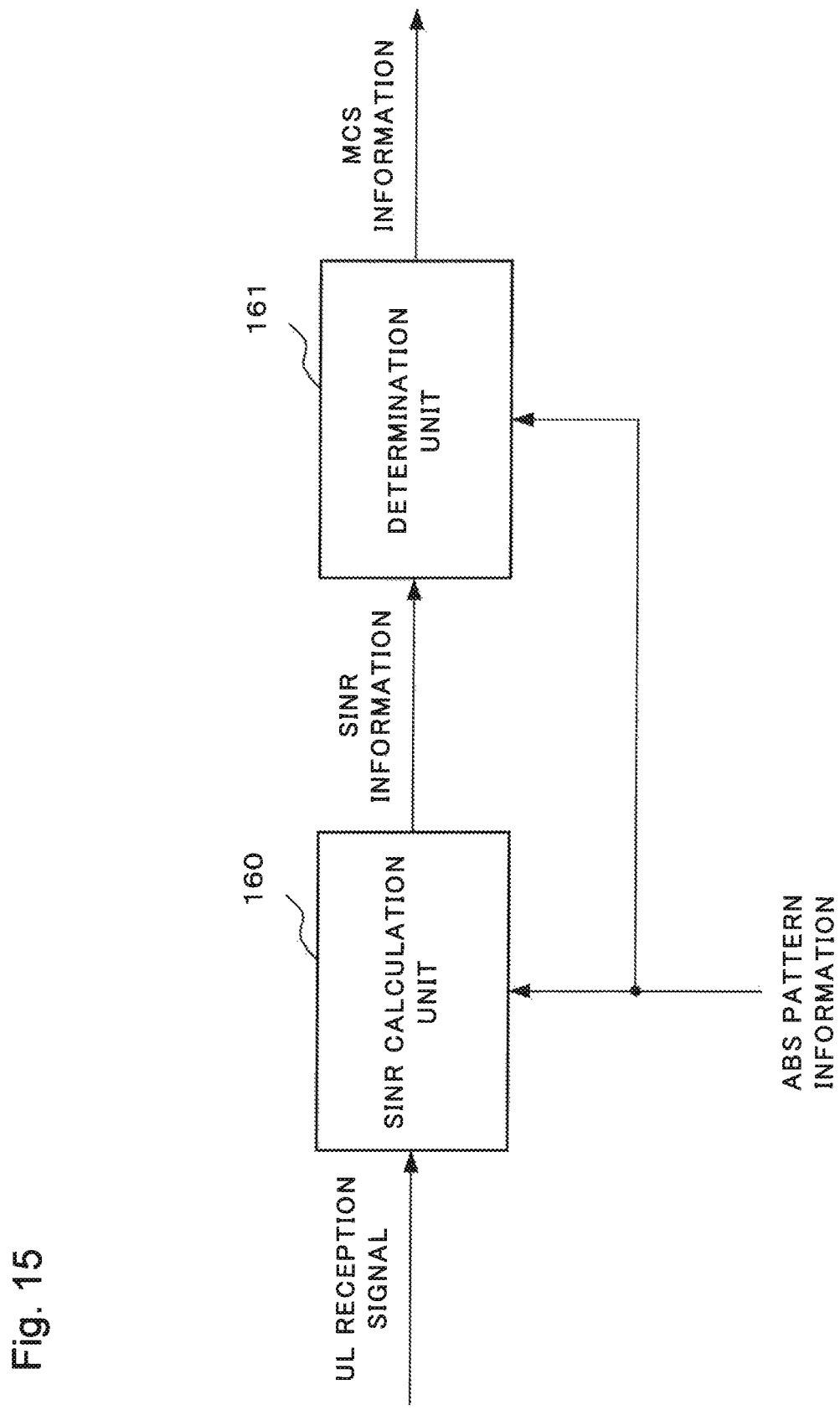
FIG. 15 is a block diagram of a control unit of the base station device according to the fifth example embodiment.

The control unit 16 includes at least an SINR calculation unit 160 and a determination unit 161 as illustrated in FIG. 15.

ABS pattern information is inputted to the SINR calculation unit 160 and the determination unit 161. Here, the ABS pattern information is ABS pattern information which is used in the macro cell 510. An UL transmission signal from the terminal device 550 to the base station device 520 is inputted to the SINR calculation unit 160.

The SINR calculation unit 160 calculates an SINR, based on the UL reception signal and the ABS pattern information. The calculated SINR is outputted to the determination unit 161 as SINR information.

Note that the UL reception signal may be various types of information related to quality such as channel quality indicator (CQI), reference signal received power (RSRP), reference signal received quality (RSRQ), path loss, sounding reference signal (SRS), and demodulation reference signal (DM-RS).

The determination unit 161 determines a MCS, based on the SINR information and the ABS pattern information. The determined MCS is outputted as MCS information.

Figure 16:
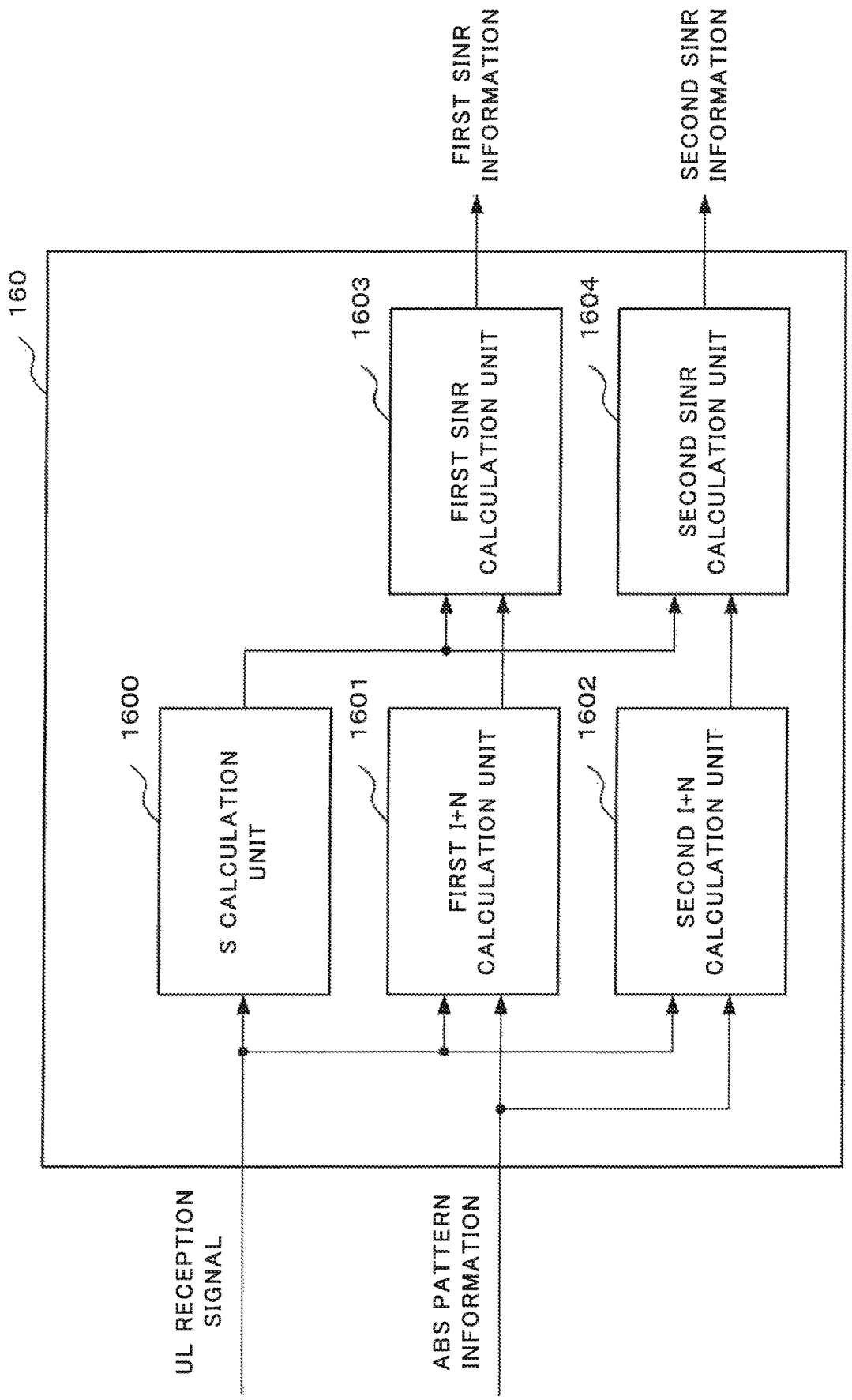
FIG. 16 is a block diagram of an SIR calculation unit of the base station device according to the fifth example embodiment.

FIG. 16 illustrates a detailed configuration of the SINR calculation unit 160.

The SINR calculation unit 160 includes at least an S calculation unit 1600, a first I+N calculation unit 1601, a second I+N calculation unit 1602, a first SINR calculation unit 1603, and a second SINR calculation unit 1604.

The S calculation unit 1600 calculates desired signal power from a terminal device, based on the UL reception signal and outputs the desired signal power. For example, based on an SRS transmitted from the terminal device, the S calculation unit 1600 calculates the desired signal power. Alternatively, based on a DM-RS transmitted from the terminal device, the S calculation unit 1600 may also calculate the desired signal power.

The first I+N calculation unit 1601 calculates interference noise power at the low interference subframe, based on the UL reception signal and the ABS pattern information. The second I+N calculation unit 1602 calculates interference noise power at the high interference subframe, based on the UL reception signal and the ABS pattern information. The first I+N calculation unit 1601 and the second I+N calculation unit 1602, for example, calculate the interference noise power, based on the DM-RS transmitted from the terminal device. Alternatively, based on the SRS transmitted from the terminal device, the first I+N calculation unit 1601 and the second I+N calculation unit 1602 may also calculate the interference noise power. Note that the desired signal power and the interference noise power may also be calculated as an average value at a plurality of subframes.

The first SINR calculation unit 1603 calculates first SINR information, based on the desired signal power calculated in the S calculation unit 1600 and the interference noise power at the low interference subframe calculated in the first I+N calculation unit 1601, and outputs the first SINR information.

The second SINR calculation unit 1604 calculates second SINR information, based on the desired signal power calculated in the S calculation unit 1600 and the interference noise power at the high interference subframe calculated in the second I+N calculation unit 1602, and outputs the second SINR information.

Figure 17:
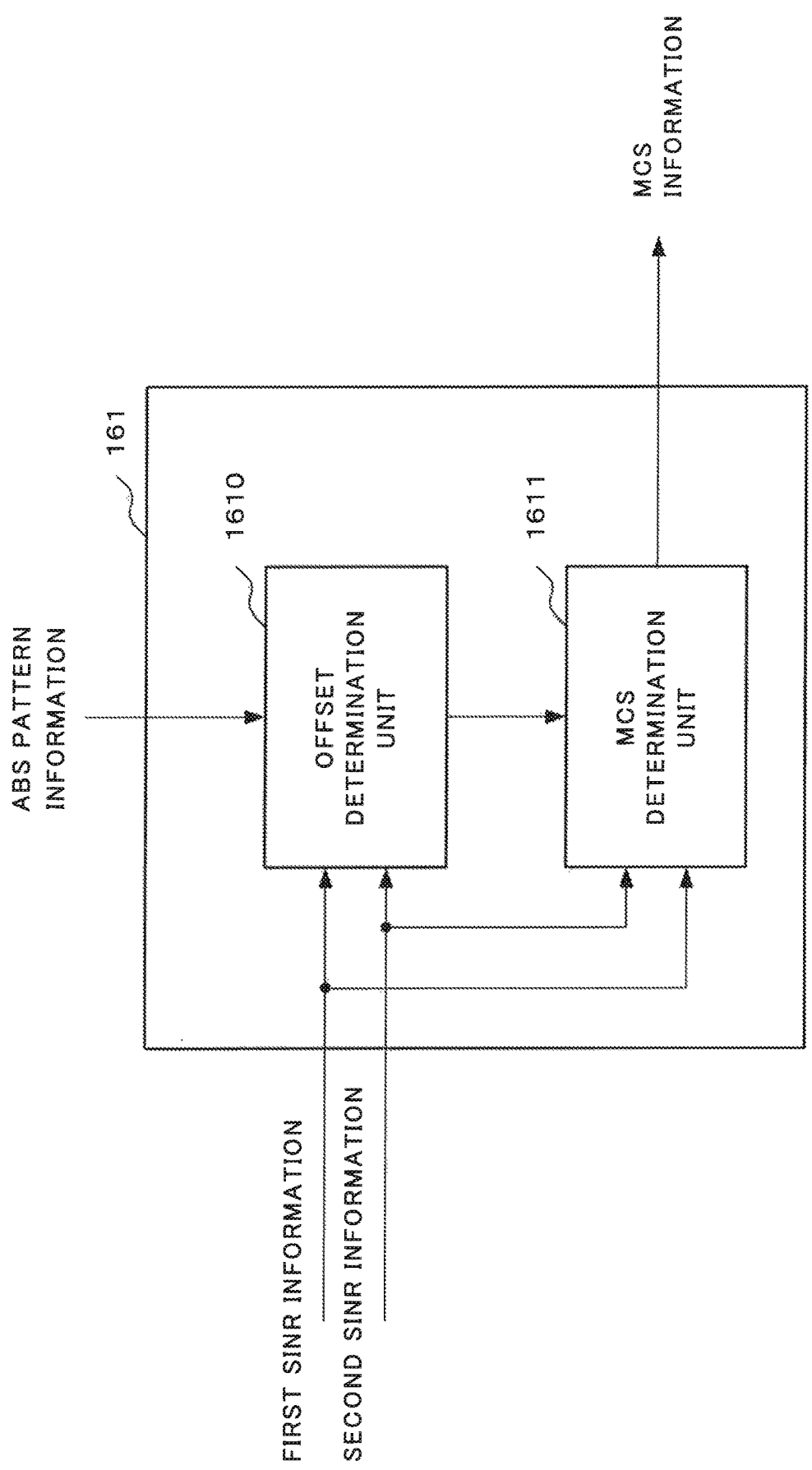
FIG. 17 is a block diagram of a MCS determination unit of the base station device according to the fifth example embodiment.

FIG. 17 illustrates a detailed configuration of the determination unit 161.

The determination unit 161 includes at least an offset determination unit 1610 and a MCS determination unit 1611.

The offset determination unit 1610 selects the first SINR information or the second SINR information according to whether each of the initial transmission timing and the retransmission timing of the terminal device 550 is the low interference subframe or the high interference subframe, based on the ABS pattern information. For example, when the initial transmission timing is the low interference subframe, the offset determination unit 1610 selects the first SINR information. Furthermore, when the retransmission timing is the high interference subframe, the offset determination unit 1610 selects the second SINR information. Then, the offset determination unit 1610 compares the SINR of the initial transmission timing and the SINR of the retransmission timing with each other, and outputs an offset value decided in advance when the SINR of the retransmission timing is smaller than the SINR of the initial transmission timing. On the other hand, when the SINR of the retransmission timing is equal to or more than the SINR of the initial transmission timing, the offset determination unit 1610 outputs a value of 0 to the MCS determination unit 1611.

The MCS determination unit 1611 selects either one of the first SINR information and the second SINR information, based on whether the initial transmission timing of the terminal device 550 is the low interference subframe or the high interference subframe, and determines a MCS, based on the selected SINR information. Moreover, the MCS determination unit 1611 determines a final MCS by adding the offset value outputted from the offset determination unit 1610 to the determined MCS. Then, the MCS determination unit 1611 outputs the final MCS as MCS information.

Figure 18:
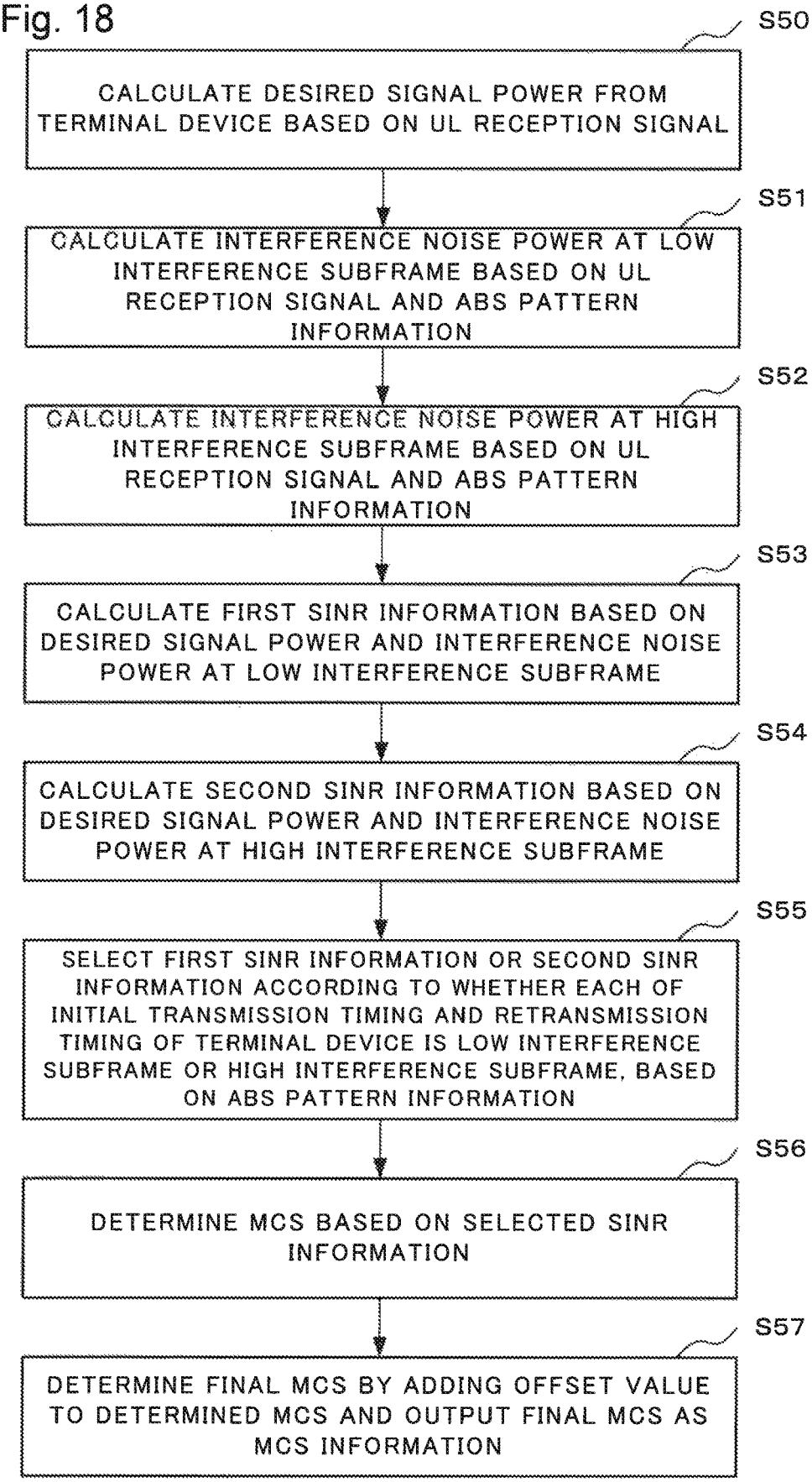
FIG. 18 is a flowchart of an operation of the base station device according to the fifth example embodiment.

Next, the operation up to the MCS determination will be described using a flowchart illustrated in FIG. 18.

The S calculation unit 1600 calculates the desired signal power from the terminal device 550, based on the UL reception signal (step S50).

The first I+N calculation unit 1601 calculates the interference noise power at the low interference subframe, based on the UL reception signal and the ABS pattern information (step S51).

The second I+N calculation unit 1602 calculates the interference noise power at the high interference subframe, based on the UL reception signal and the ABS pattern information (step S52).

The first SINR calculation unit 1603 calculates the first SINR information, based on the desired signal power and the interference noise power at the low interference subframe (step S53).

The second SINR calculation unit 1604 calculates the second SINR information, based on the desired signal power and the interference noise power at the high interference subframe (step S54).

The offset determination unit 1610 selects the first SINR information or the second SINR information according to whether each of the initial transmission timing and the retransmission timing of the terminal device 550 is the low interference subframe or the high interference subframe, based on the ABS pattern information (step S55).

The MCS determination unit 1611 determines the MCS, based on the selected SINR information (step S56).

The MCS determination unit 1611 determines the final MCS by adding the offset value outputted from the offset determination unit 1610 to the determined MCS. Then, the MCS determination unit 1611 outputs the final MCS as the MCS information (step S57).

The base station device 520 in the present example embodiment can predict communication quality in initial transmission and retransmission by using the ABS pattern information. Then, based on the predicted communication quality, the base station device 520 can determine the MCS. Therefore, even in an environment in which the ABS pattern is set, it is possible to reduce the number of times by which a signal is retransmitted.

Sixth Example Embodiment

In the present example embodiment, a base station device has a function of transmitting information on a determined modulation and coding scheme to a terminal device.

Figure 19:
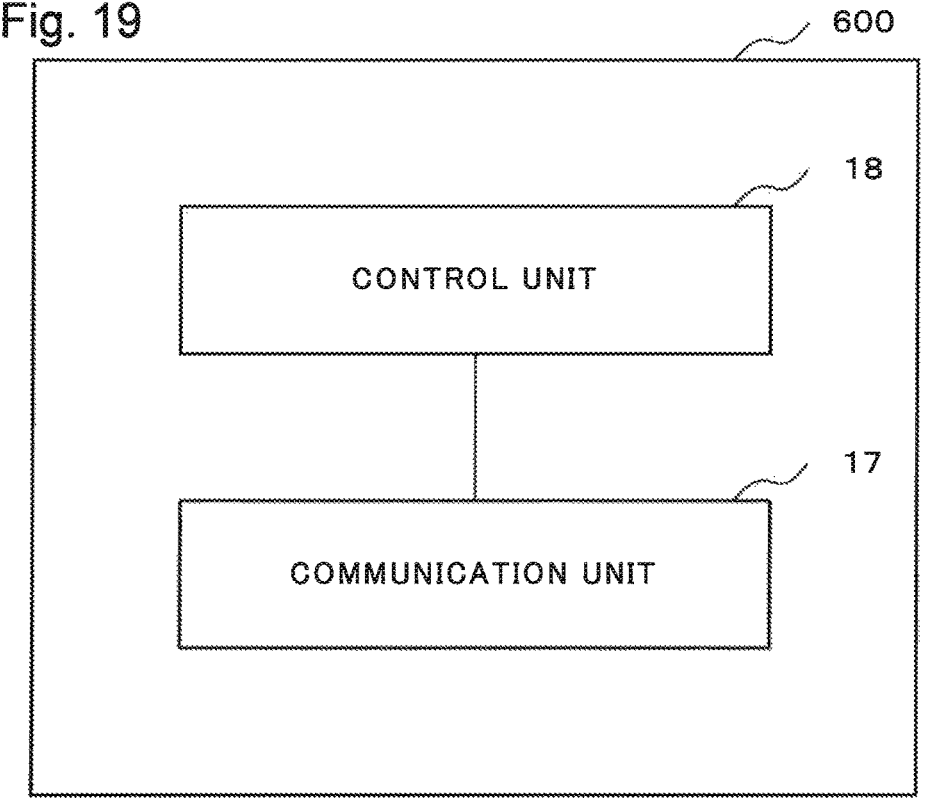
FIG. 19 is a block diagram of a base station device according to a sixth example embodiment.

FIG. 19 illustrates an example of a configuration of a base station device 600 in the present example embodiment.

The base station device 600 includes at least a communication unit 17 and a control unit 18.

The communication unit 17 transmits information on a modulation and coding scheme determined by the control unit 18 to a terminal device 610.

The control unit 18 performs any one of the operations of the aforementioned control unit 11 to control unit 16.

Figure 20:
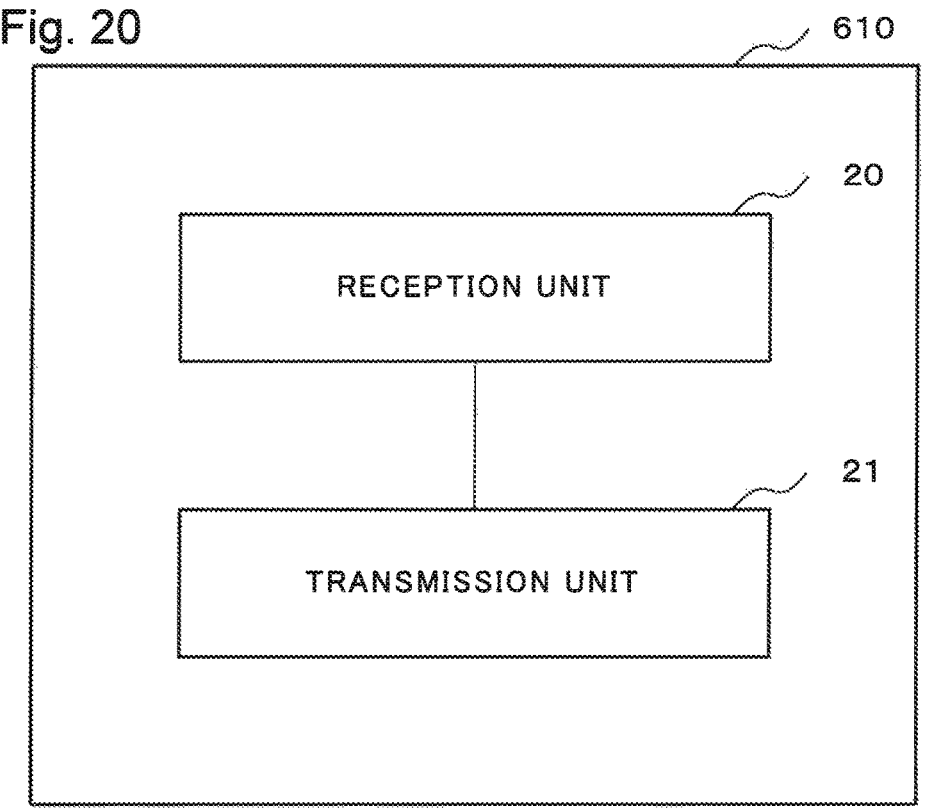
FIG. 20 is a block diagram of a terminal device according to the sixth example embodiment.

FIG. 20 illustrates an example of a configuration of the terminal device 610 in the present example embodiment.

The terminal device 610 includes at least a reception unit 20 and a transmission unit 21.

The reception unit 20 receives the information on the modulation and coding scheme determined by the control unit 18 from the base station device 600.

The transmission unit 21 transmits or retransmits a signal to the base station 600, based on the information on the modulation and coding scheme received in the reception unit 20.

Figure 21:
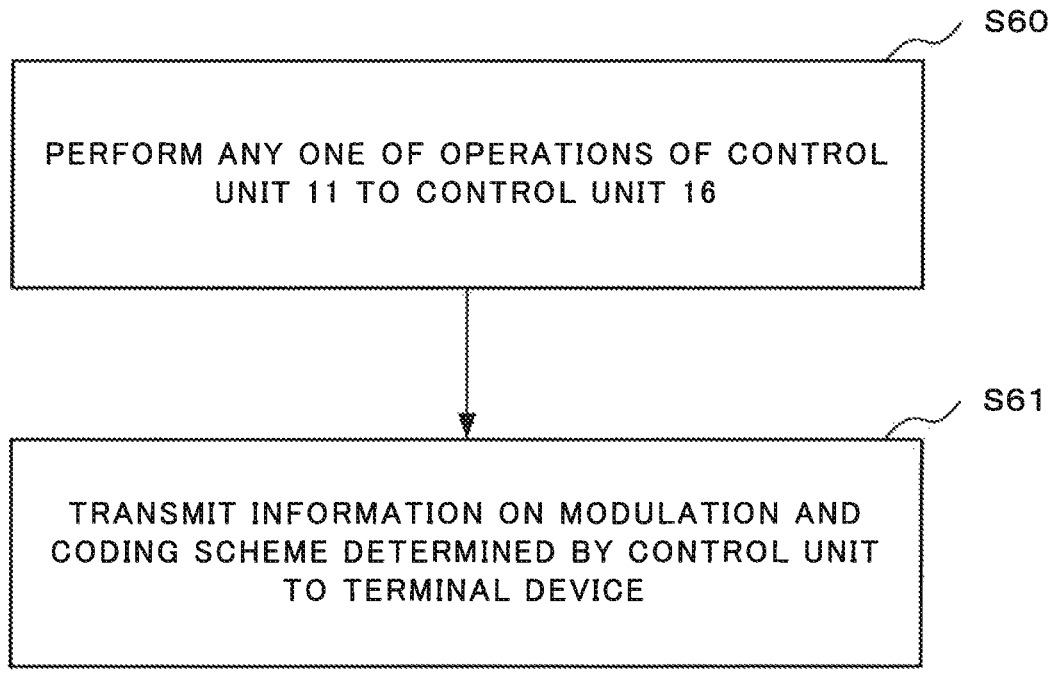
FIG. 21 is a flowchart of an operation of the base station device according to the sixth example embodiment.

Next, the operation of the base station 600 of the present example embodiment will be described using FIG. 21.

Firstly, the control unit 18 performs any one of the operations of the aforementioned control unit 11 to control unit 16 (step S60).

The communication unit 17 transmits the information on the modulation and coding scheme determined by the control unit 18 to the terminal device 610 (step S61).

Figure 22:
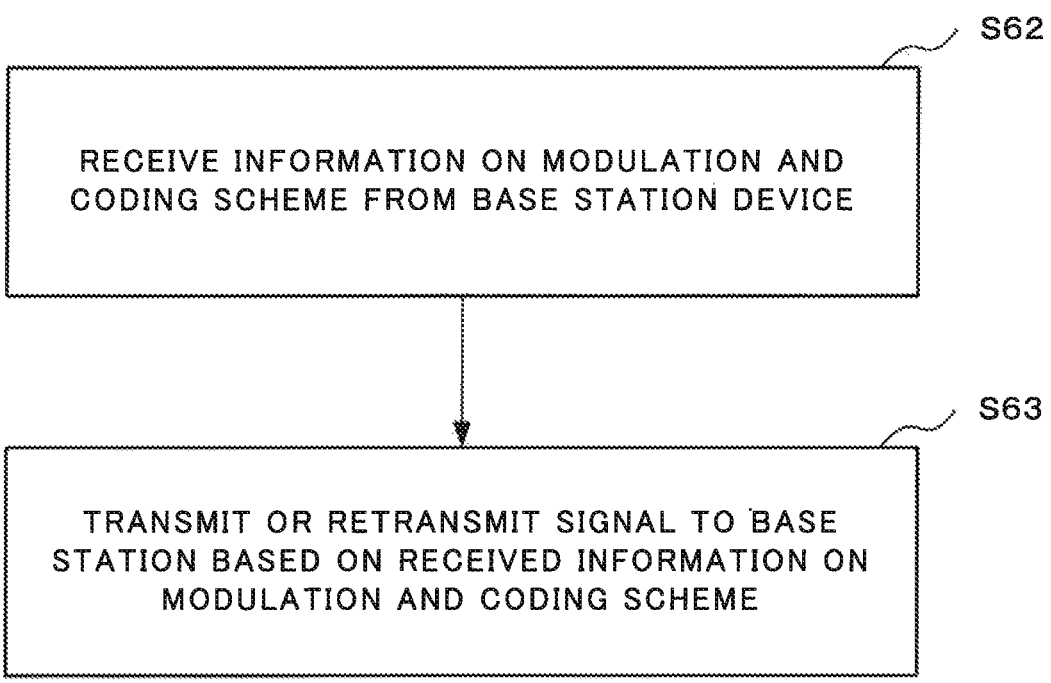
FIG. 22 is a flowchart of an operation of the terminal device according to the sixth example embodiment.

Next, the operation of the terminal device 610 of the present example embodiment will be described using FIG. 22.

Firstly, the reception unit 20 receives the information on the modulation and coding scheme determined by the control unit 18 from the base station device 600 (step S62).

The transmission unit 21 transmits or retransmits a signal to the base station 600, based on the information on the modulation and coding scheme received by the reception unit 20 (step S63).

In the present example embodiment, the base station device 600 transmits the information on the determined modulation and coding scheme to a terminal device. Therefore, based on the information on the determined modulation and coding scheme, the terminal device can perform UL transmission with respect to the base station device.

Note that in the aforementioned example embodiment, based on the information on the modulation and coding scheme determined by the base station device 600, the terminal device 610 performs UL transmission; however, based on the information on the modulation and coding scheme determined by the base station device 600, the base station device 600 may also perform DL transmission with respect to the terminal device 610.

Note that in the aforementioned each example embodiment, the control unit utilizes the information on communication quality at two timings of the first timing (or the initial transmission) and the second timing (or the retransmission); however, the control unit may also utilize information on communication quality up to an $n^{th}$ timing (N is a natural number). For example, N may be a maximum number of times of retransmissions. Furthermore, the control unit may also set the offset value, based on the number of subframes serving as the high interference subframes (or a ratio of the high interference subframes) at transmission timings up to N times.

Furthermore, each process of the aforementioned each example embodiment may be implemented by software. That is, a computer program for performing each process may be read and executed by a central processing unit (CPU) included in an information processing device. Even though each process is performed using the program, it is possible to perform processes having the same contents as those of the processes of the aforementioned example embodiments. The aforementioned program may also be stored in a semiconductor storage device such as a read only memory (ROM), a random access memory (RAM), and a flash memory, or a non-transitory medium such as an optical disk, a magnetic disk, and a magneto-optical disk.

A part or the whole of the aforementioned each example embodiment is also described as the following supplementary notes, but is not limited thereto.

(Supplementary note 1) A base station device including: a control unit that determines a first modulation and coding scheme to be applied to a signal, based on information on predicted first communication quality when the signal is transmitted at a first timing and information on predicted second communication quality when the signal is retransmitted at a second timing, and; a transmission unit that transmits the signal to a terminal device, based on information on the first modulation and coding scheme.

(Supplementary note 2) The base station device according to Supplementary note 1, wherein when the second communication quality is lower than the first communication quality, the control unit determines the first modulation and coding scheme, based on the information on the second communication quality.

(Supplementary note 3) The base station device according to Supplementary note 1, wherein when the information on the first communication quality is a first value and the information on the second communication quality is a second value, the control means determines the first modulation and coding scheme, based on an average value of the first value and the second value.

(Supplementary note 4) The base station device according to Supplementary note 1, wherein when the information on the first communication quality is a first value and the information on the second communication quality is a second value, the control means determines the first modulation and coding scheme, based on: an offset value which is determined based on a difference between the first value and the second value; and a second modulation and coding scheme which is determined based on the first value.

(Supplementary note 5) The base station device according to Supplementary note 1, wherein when the information on the first communication quality is a first value and the information on the second communication quality is a second value, the control unit determines the first modulation and coding scheme, based on a value obtained by adding an offset value to the first value, the offset value being determined based on a difference between the first value and the second value.

(Supplementary note 6) The base station device according to any one of Supplementary notes 1 to 5, wherein when the second communication quality is lower than the first communication quality, the control unit determines a modulation and coding scheme, in which a number of bits transmittable per one symbol is smaller than a number of bits of the second modulation and coding scheme determined based on the first information, as the first modulation and coding scheme.

(Supplementary note 7) The base station device according to any one of Supplementary notes 1 to 6, wherein the base station device is a small cell base station device and a neighboring base station device adjacent to the base station device is a macro cell base station device, an almost blanc subframe (ABS) subframe and a non-ABS subframe are set in the macro cell base station device, the first timing is a timing of the ABS subframe, the second timing is a timing of the non-ABS subframe, the information on the first communication quality is information on communication quality when the signal is transmitted between a terminal device and the small cell base station device at the timing of the ABS subframe, and the information on the second communication quality is information on communication quality when the signal is transmitted between the terminal device and the small cell base station device at the timing of the non-ABS subframe.

(Supplementary note 8) The base station device according to any one of Supplementary notes 1 to 7, further including: a transmission unit that transmits information on the first modulation and coding scheme to the terminal device.

(Supplementary note 9) A communication system including a base station device and a terminal device, wherein the base station device includes: a control unit that determines a first modulation and coding scheme to be applied to a signal, based on information on predicted first communication quality when the signal is transmitted at a first timing and information on predicted second communication quality when the signal is retransmitted at a second timing; a transmission unit that transmits information on the first modulation and coding scheme to the terminal device, and the terminal device includes: a reception unit that receives the information on the first modulation and coding scheme from the base station device.

(Supplementary note 10) A control method including a step of determining a first modulation and coding scheme to be applied to a signal, based on information on predicted first communication quality when the signal is transmitted at a first timing and information on predicted second communication quality when the signal is retransmitted at a second timing.

(Supplementary note 11) A control method including: a step of receiving, from a base station device, information on a first modulation and coding scheme determined based on first information on predicted first communication quality when a signal is transmitted at a first timing and second information on predicted second communication quality when the signal is retransmitted at a second timing; and a step of transmitting the signal to the base station device, based on the information on the first modulation and coding scheme.

(Supplementary note 12) A program having a program code capable of executing a control method including a step of determining a first modulation and coding scheme to be applied to a signal, based on information on predicted first communication quality when the signal is transmitted at a first timing and information on predicted second communication quality when the signal is retransmitted at a second timing, when the program is executed on a computer.

(Supplementary note 13) A program having a program code capable of executing a control method including: a step of receiving, from a base station device, information on a first modulation and coding scheme determined based on first information on predicted first communication quality when a signal is transmitted at a first timing and second information on predicted second communication quality when the signal is retransmitted at a second timing; and a step of transmitting the signal to the base station device, based on the information on the first modulation and coding scheme, when the program is executed on a computer.

(Supplementary note 14) A storage medium which is an information storage medium readable in a computer and stores the program according to Supplementary note 12.

(Supplementary note 15) A storage medium which is an information storage medium readable in a computer and stores the program according to Supplementary note 13.

(Supplementary note 16) A terminal device including: a reception unit that receives, from a base station device, information on a first modulation and coding scheme determined based on first information on predicted first communication quality when a signal is transmitted at a first timing and second information on predicted second communication quality when the signal is retransmitted at a second timing; and a transmission unit that transmits the signal to the base station device, based on the information on the first modulation and coding scheme.

While the invention has been particularly shown and described with reference to exemplary embodiments thereof, the invention is not limited to these embodiments. It will be understood by those of ordinary skill in the art that various changes in form and details may be made therein without departing from the spirit and scope of the present invention as defined by the claims.

This application is based upon and claims the benefit of priority from Japanese patent application No. 2015-193436, filed on Sep. 30, 2015, the disclosure of which is incorporated herein in its entirety by reference.

REFERENCE SIGNS LIST 10, 17 communication unit
11, 12, 13, 14, 15, 16, 18 control unit
20 reception unit
21 transmission unit
100, 200, 300, 400, 410, 500, 520, 600 base station device
160 SINR calculation unit
161 determination unit
510 macro cell
530 small cell
540, 550, 610 terminal device
1600 S calculation unit
1601 first I+N calculation unit
1602 second I+N calculation unit
1603 first SINR calculation unit
1604 second SINR calculation unit
1610 offset determination unit
1611 MCS determination unit

What is claimed is:

1. A base station device comprising:
a control unit implemented at least in hardware comprising a processor and memory, for determining a first modulation and coding scheme to be applied to a signal, based on information on predicted first communication quality when the signal is transmitted at a first timing and information on predicted second communication quality when the signal is retransmitted at a second timing; and
a transmission unit implemented at least in the hardware, for transmitting information on the first modulation and coding scheme to the terminal device, wherein
when the information on the first communication quality is a first value and the information on the second communication quality is a second value, the control unit determines the first modulation and coding scheme, based on a value obtained by adding an offset value to the first value, the offset value being determined based on a difference between the first value and the second value.

2. The base station device according to claim 1, wherein when the second communication quality is lower than the first communication quality, the control unit determines the first modulation and coding scheme, based on the information on the second communication quality.

3. The base station device according to claim 1, wherein when the information on the first communication quality is a first value and the information on the second communication quality is a second value, the control unit determines the first modulation and coding scheme, based on an average value of the first value and the second value.

4. The base station device according to claim 1, wherein when the second communication quality is lower than the first communication quality, the control unit determines a modulation and coding scheme, in which a number of bits transmittable per one symbol is smaller than a number of bits of the second modulation and coding scheme determined based on the first information, as the first modulation and coding scheme.

5. The base station device according to claim 1, wherein the base station device is a small cell base station device and a neighboring base station device adjacent to the base station device is a macro cell base station device,
an almost blank subframe (ABS) subframe and a non-ABS subframe are set in the macro cell base station device,
the first timing is a timing of the ABS subframe,
the second timing is a timing of the non-ABS subframe,
the information on the first communication quality is information on communication quality when the signal is transmitted between a terminal device and the small cell base station device at the timing of the ABS subframe, and
the information on the second communication quality is information on communication quality when the signal is transmitted between the terminal device and the small cell base station device at the timing of the non-ABS subframe.

6. A terminal device comprising:
a reception unit implemented at least in hardware including a processor and memory, for receiving, from a base station device, information on a first modulation and coding scheme determined based on first information on predicted first communication quality when a signal is transmitted at a first timing and second information on predicted second communication quality when the signal is retransmitted at a second timing; and
a transmission unit, implement at least in the hardware, for transmitting the signal to the base station device, based on the information on the first modulation and coding scheme, wherein
when the information on the first communication quality is a first value and the information on the second communication quality is a second value, the first modulation and coding scheme are determined based on a value obtained by adding an offset value to the first value, the offset being determined based on a difference between the first value and the second value.

7. A communication system comprising a base station device and a terminal device, wherein
the base station device comprises:
a control unit implemented at least in hardware including a processor and memory, for determining a first modulation and coding scheme to be applied to a signal, based on information on predicted first communication quality when the signal is transmitted at a first timing and information on predicted second communication quality when the signal is retransmitted at a second timing;
a transmission unit implemented at least in the hardware, for transmitting information on the first modulation and coding scheme to the terminal device, wherein
when the information on the first communication quality is a first value and the information on the second communication quality is a second value, the first modulation and coding scheme are determined based on a value obtained by adding an offset value to the first value, the offset being determined based on a difference between the first value and the second value, and
the terminal device receives the information on the first modulation and coding scheme from the base station device.

\* \* \* \* \*